United States Patent
Yamada et al.

(10) Patent No.: US 9,742,954 B2
(45) Date of Patent: Aug. 22, 2017

(54) DATA PROCESSING APPARATUS, DATA PROCESSING METHOD, AND NON-TRANSITORY COMPUTER READABLE MEDIUM

(71) Applicant: FUJI XEROX Co., Ltd., Tokyo (JP)

(72) Inventors: Kazuo Yamada, Kanagawa (JP); Mitsuyuki Tamatani, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/092,873

(22) Filed: Apr. 7, 2016

(65) Prior Publication Data

US 2017/0187909 A1    Jun. 29, 2017

(30) Foreign Application Priority Data

Dec. 24, 2015 (JP) ................ 2015-250832

(51) Int. Cl.
*G06F 15/00* (2006.01)
*H04N 1/21* (2006.01)

(52) U.S. Cl.
CPC ....... *H04N 1/21* (2013.01); *H04N 2201/0094* (2013.01)

(58) Field of Classification Search
USPC ............................... 358/1.8, 1.18
See application file for complete search history.

(56) References Cited

U.S. PATENT DOCUMENTS

| 2010/0046011 A1* | 2/2010 | Tripp | G06K 15/105 358/1.8 |
| 2010/0122071 A1 | 5/2010 | Yoshikawa et al. | |
| 2011/0254889 A1* | 10/2011 | Miller | G06K 15/1898 347/14 |

FOREIGN PATENT DOCUMENTS

| JP | 2005-353061 A | 12/2005 |
| JP | 2010-117806 A | 5/2010 |
| JP | 2011-061438 A | 3/2011 |

* cited by examiner

*Primary Examiner* — Saeid Ebrahimi Dehkord
(74) *Attorney, Agent, or Firm* — Sughrue Mion, PLLC

(57) ABSTRACT

A data processing apparatus includes a preprocessing section that causes an input data column to serve as a first determination data column and obtains a second determination data column by delaying the input data column and obtains a processing data column by delaying the input data column by an amount larger than an amount by which the input data column is delayed in order to obtain the second determination data column and a controller that controls, by using the first determination data column and the second determination data column as indices, an operation performed by a FIFO memory for outputting the processing data column, which has been input to the FIFO memory.

11 Claims, 6 Drawing Sheets

DATA PROCESSING APPARATUS, DATA PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-250832 filed Dec. 24, 2015.

BACKGROUND (i) Technical Field

The present invention relates to a data processing apparatus, a data processing method, and a non-transitory computer readable medium.

(ii) Related Art

Data processing apparatuses have widely become popular in various fields, and in particular, an image processing apparatus that is configured to perform processing on image data is a specific example of such data processing apparatuses. In the related art, some techniques that are related to data processing apparatuses and image processing apparatuses have been proposed.

SUMMARY

According to an aspect of the invention, there is provided a data processing apparatus including a preprocessing section that causes an input data column to serve as a first determination data column and obtains a second determination data column by delaying the input data column and obtains a processing data column by delaying the input data column by an amount larger than an amount by which the input data column is delayed in order to obtain the second determination data column and a controller that controls, by using the first determination data column and the second determination data column as indices, an operation performed by a FIFO memory for outputting the processing data column, which has been input to the FIFO memory.

BRIEF DESCRIPTION OF THE DRAWINGS

An exemplary embodiment of the present invention will be described in detail based on the following figures, wherein.

DETAILED DESCRIPTION

Figure 1:
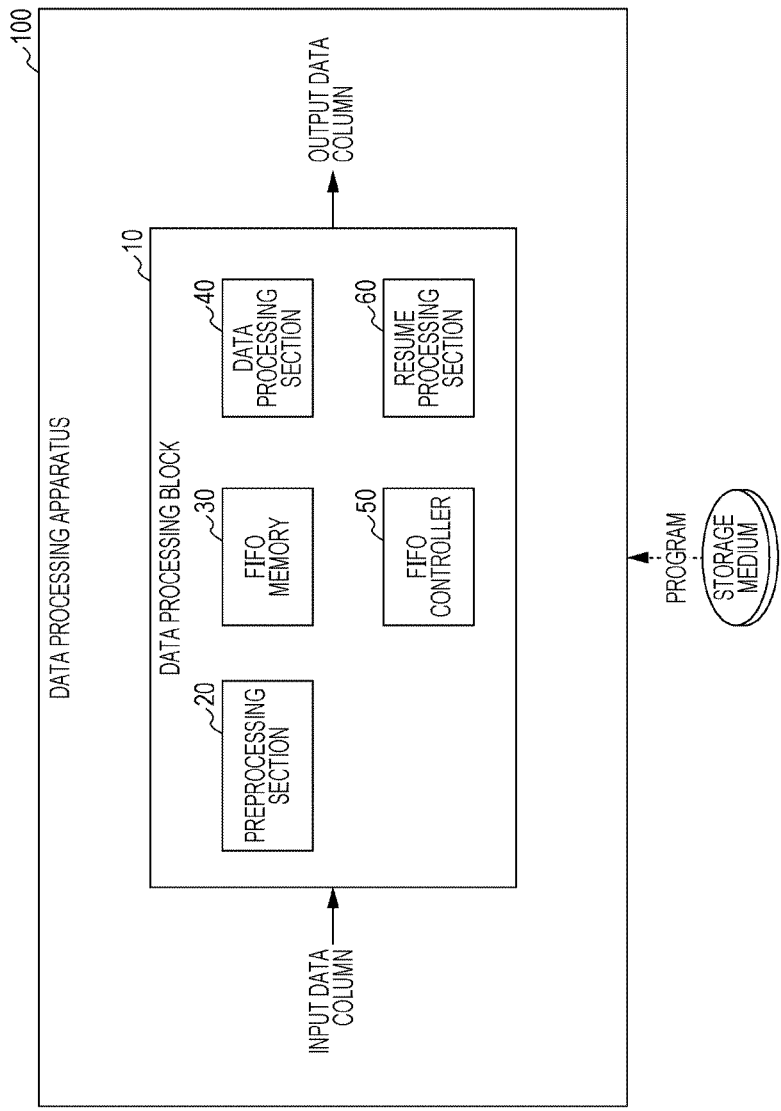
FIG. 1 is a diagram illustrating an overall configuration of a data processing apparatus according to an exemplary embodiment of the present invention.

FIG. 1 is a diagram illustrating the overall configuration of a data processing apparatus 100 according to an exemplary embodiment of the present invention. The data processing apparatus 100 illustrated in FIG. 1 performs data processing on an input data column, which is a processing target, and includes a data processing block 10 that outputs an output data column, which is obtained after performing data processing.

Specific examples of the input data column, which is a target for processing performed by the data processing apparatus 100 illustrated in FIG. 1, are image data items (including data items each containing only one of a letter, a number, and a symbol) and the like, and for example, an image data item is transmitted to the data processing apparatus 100 from an external apparatus, such as a computer.

The data processing apparatus 100 illustrated in FIG. 1 may be incorporated within an image processing apparatus that has an image reading function (scan function) and the like, and an image data item obtained from a medium, such as a sheet, by using the image reading function may be a target data item. An image corresponding to an image data item on which processing has been performed by the data processing apparatus 100 may be printed on a print medium, such as a sheet, or the image data item, on which the processing has been performed, may be provided to an external apparatus. Note that specific examples of the image processing apparatus include a copying machine, a printing machine, and a facsimile (FAX) machine. In addition, a multifunction machine that has functions of serving as more than one of a copying machine, a printing machine, and a facsimile machine is another specific example of the image processing apparatus.

The data processing block 10 performs data processing on an input data column. In the specific example illustrated in FIG. 1, the data processing block 10 includes a preprocessing section 20, a FIFO memory 30, a data processing section 40, a FIFO controller 50, and a resume processing section 60.

At least part of the data processing block 10 may be realized by a data processing circuit. Although such a data processing circuit is able to be realized by a device such as, for example, an application specific integrated circuit (ASIC) that realizes a fixed-type circuit configuration, which is nonprogrammable, it is desirable that such a data processing circuit be realized by a reconfigurable circuit whose circuit configuration is programmable.

A reconfigurable circuit is a circuit whose internal circuit configuration is able to be reconfigured (is programmable). For example, a dynamically reconfigurable processor (DRP) is one of devices that may realize such a reconfigurable circuit. Obviously, such a reconfigurable circuit may be realized by other devices which are, for example, programmable logic circuits, such as a programmable logic device (PLD) and a field programmable gate array (FPGA). Alternatively, such a reconfigurable circuit may be realized by using a dynamically reconfigurable device (processor or the like) that will come on the market in the future. Note that the above-mentioned processors and devices are merely examples, and other hardware may be used for realizing at least part of the data processing block 10.

Alternatively, at least part of the data processing block 10 may be formed of, for example, hardware that realizes a calculation function and the like and software (a control program or the like) that defines the operation of the hardware and may be realized as a result of the hardware and the software cooperating with each other. For example, at least part of the functions of the preprocessing section 20, the data processing section 40, the FIFO controller 50, and the resume processing section 60 may be realized by a computer. In this case, programs that will be described in detail later and that realize algorithms corresponding to these functions are stored in, for example, a computer readable storage medium, such as a disc or a memory, and the programs are provided to the computer (data processing apparatus 100) via the storage medium. Obviously, the programs may be provided to the computer via an electric communication line, such as the Internet. For example, the functions of at least part of the data processing block 10 are realized as a result of hardware resources, such as a CPU and a memory, which are included in the computer, and the programs (software), which have been provided to the computer, cooperating with each other.

The overall configuration of the data processing apparatus 100 illustrated in FIG. 1 has been described above, and the data processing block 10 that is included in the data processing apparatus 100 will now be described. Note that the reference numerals in FIG. 1 will be used in the following description of the configuration (each component denoted by the reference numerals) illustrated in FIG. 1.

Figure 2:
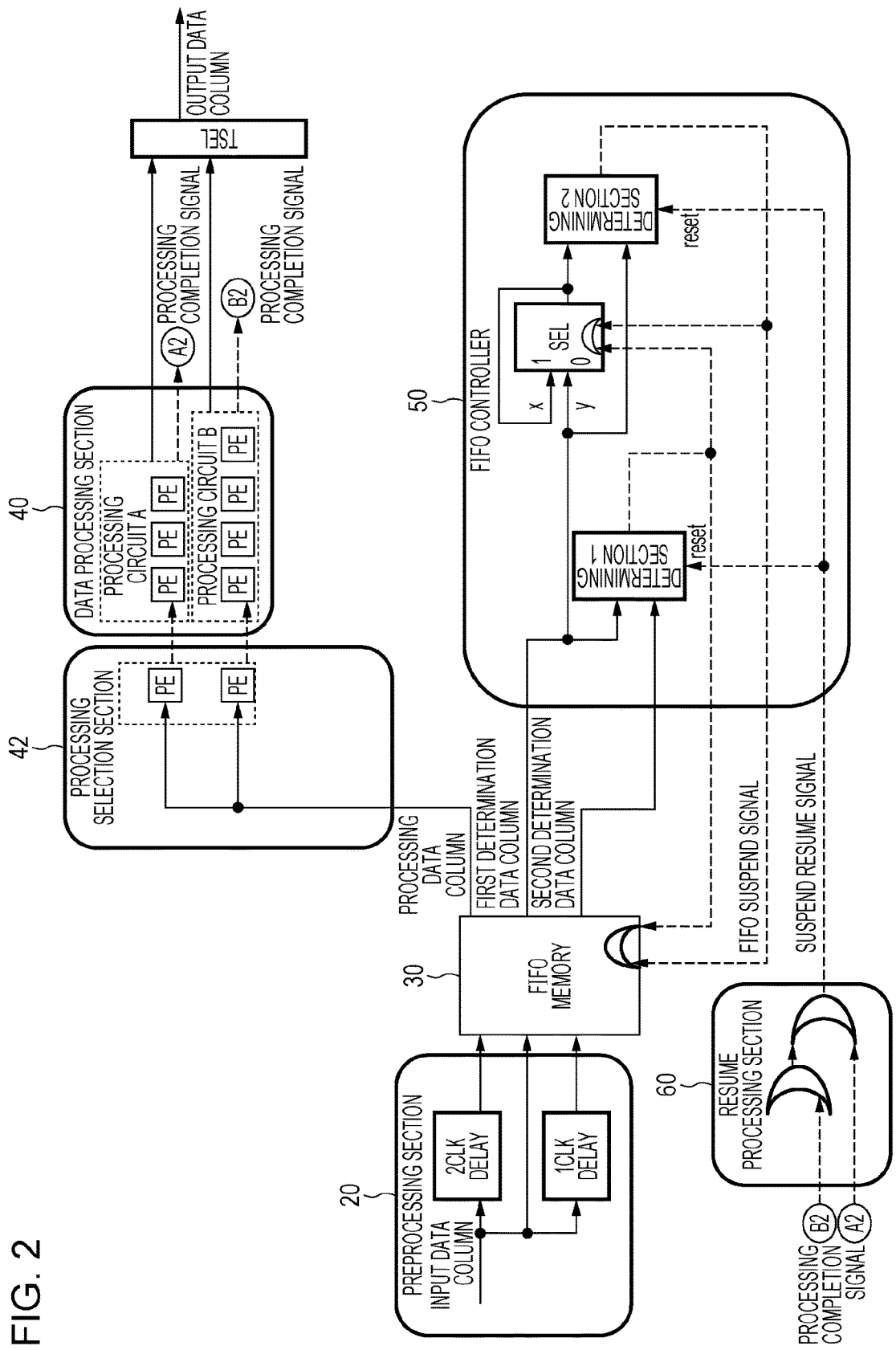
FIG. 2 is a diagram illustrating a specific example of an internal structure of a data processing block.

FIG. 2 is a diagram illustrating a specific example of the internal structure of the data processing block 10. In the specific example illustrated in FIG. 2, the data processing block 10 includes the preprocessing section 20, the FIFO memory 30, the data processing section 40, the FIFO controller 50, the resume processing section 60, and a processing selection section 42.

An input data column is formed of plural data elements arranged in a line. A specific example of the input data column is image data that is formed of a column of plural pixel data items. The input data column input to the data processing block 10 is processed by the preprocessing section 20 first.

The preprocessing section 20 causes the input data column to serve as a first data column for use in determination processing (hereinafter referred to as a first determination data column). In addition, the preprocessing section 20 generates a second data column for use in determination processing (hereinafter referred to as a second determination data column) by delaying the input data column and generates a processing data column by delaying the input data column by an amount larger than the amount by which the input data column is delayed in order to obtain the second determination data column.

For example, the preprocessing section 20 causes the input data column to serve as the first determination data column without delaying the input data column. In addition, the preprocessing section 20 obtains the second determination data column by performing delay processing so as to delay the input data column by one delay corresponding to one of the data elements, that is, for example, one clock (CLK) corresponding to one pixel. Furthermore, the preprocessing section 20 obtains the processing data column by performing delay processing so as to delay the input data column by two delays corresponding to two of the data elements, that is, for example, two clocks (CLKs) corresponding to two pixels. The first determination data column, the second determination data column, and the processing data column, which have been generated by the preprocessing section 20, are input to the FIFO memory 30.

The first-in first-out (FIFO) memory 30 is a memory device that temporarily stores a data column input thereto. Plural data elements that form a data column input to the FIFO memory 30 are output in the order in which the data elements are input (are processed in a first-in-first-out order). In the specific example illustrated in FIG. 2, each of the first determination data column, the second determination data column, and the processing data column is processed in a first-in-first-out order.

The processing data column output by the FIFO memory 30 is transmitted to the data processing section 40 via the processing selection section 42. The data processing section 40 performs data processing on plural data elements that form the processing data column. For example, the data processing section 40 performs image processing operations on plural pixel data items that form a processing data column in accordance with the pixel data items. The image processing operations according to the pixel data items are selected by the processing selection section 42.

In the specific example illustrated in FIG. 2, the data processing section 40 includes a processing circuit A that performs image processing A and a processing circuit B that performs image processing B. Regarding the pixel data items of the processing data column that are output one after another from the FIFO memory 30, the processing selection section 42 outputs the pixel data items that are required to undergo the image processing A to the processing circuit A of the data processing section 40 and outputs the pixel data items that are required to undergo the image processing B to the processing circuit B of the data processing section 40.

Note that each of the data processing section 40 and the processing selection section 42 may be realized by, for example, a reconfigurable circuit, such as a dynamically reconfigurable processor (DRP). For example, at least part of the circuit configuration within the data processing section 40 and at least part of the circuit configuration within the processing selection section 42 are formed of plural processor elements (PEs) of a reconfigurable circuit.

The plural data elements that have undergone the data processing performed by the data processing section 40 are transmitted to a token selector (TSEL). The token selector (TSEL) outputs the data elements, which have undergone the data processing and which have been output by the data processing section 40, one after another as output data columns. In the specific example illustrated in FIG. 2, in the case where the TSEL has obtained pixel data items from the processing circuit A of the data processing section 40, the TSEL outputs the pixel data items obtained from the processing circuit A as an output data column, and in the case where the TSEL has obtained pixel data items from the processing circuit B of the data processing section 40, the TSEL outputs the pixel data items obtained from the processing circuit B as an output data column.

Note that a pixel data item that will not undergo image processing (that is not required to undergo image processing) may be included in the processing data column. For example, such a pixel data item that will not undergo image processing may be directly transmitted from the processing selection section 42 to the TSEL or may be transmitted from the processing selection section 42 to the TSEL through a path, in which image processing will not be performed, in the data processing section 40.

The FIFO controller 50 controls, on the basis of the first determination data column and the second determination data column, an operation performed by the FIFO memory 30 for outputting the processing data column. In the specific example illustrated in FIG. 2, the FIFO controller 50 includes a determining section 1, an SEL, and a determining section 2.

The determining section 1 compares the first determination data column and the second determination data column, each of which is output by the FIFO memory 30, so as to determine the continuity of the data elements included in the first determination data column and the second determination data column and outputs a determination signal indicating a suspend instruction in accordance with the determination results. The SEL functions as a holding section that holds the suspend instruction, which is indicated by the determination signal output by the determining section 1, until the SEL receives a resume instruction. The determining section 2 outputs a FIFO suspend signal in accordance with an output from the SEL.

The resume processing section 60 outputs a resume signal indicating a resume instruction by using, as triggers for the output operation, completion timings at which the data processing operations that are performed on the data elements, which are included in the processing data column, are completed. Processing completion signals indicating the completion timings for the data processing operations are output by the data processing section 40. In the specific example illustrated in FIG. 2, for example, when the image processing A performed on the pixel data items by the processing circuit A has been completed, a processing completion signal A2 is output by the data processing section 40, and when the image processing B performed on the pixel data items by the processing circuit B has been completed, a processing completion signal B2 is output by the data processing section 40.

Figure 3:
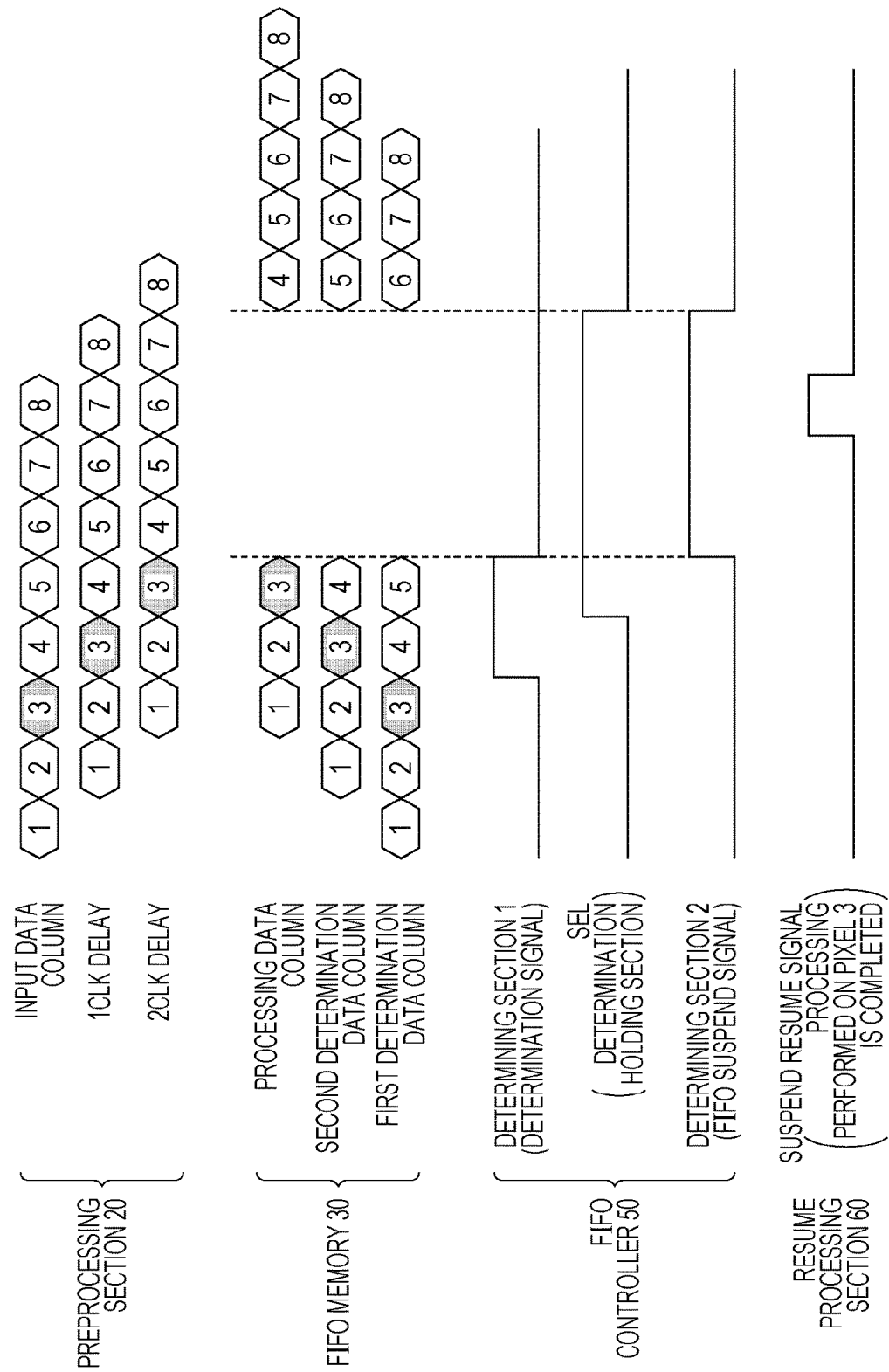
FIG. 3 is a diagram illustrating a specific example of control performed by the data processing block.

FIG. 3 is a diagram illustrating a specific example of control performed by the data processing block 10. FIG. 3 illustrates a timing chart of data items to be processed in the sections of the data processing block 10 illustrated in FIG. 2.

In the specific example illustrated in FIG. 3, an input data column that is input to the preprocessing section 20 is formed of plural pixel data items corresponding to plural pixels (pixels 1, 2, 3, and so on). Among the plural pixel data items forming the input data column, only the pixel data item of the pixel 3 is a target for image processing. In other words, the pixel data items other than the pixel data item of the pixel 3 will not undergo image processing.

The preprocessing section 20 causes the input data column to serve as a first determination data column and generates a second determination data column obtained by delaying the input data column by one CLK corresponding to one pixel and a processing data column obtained by delaying the input data column by two CLKs corresponding to two pixels. The first determination data column, the second determination data column, and the processing data column, which have been obtained in the preprocessing section 20, are input to the FIFO memory 30.

Accordingly, the second determination data column to be output by the FIFO memory 30 is output, while being delayed by one pixel (one CLK), after the first determination data column has been output, and the processing data column to be output by the FIFO memory 30 is output, while being delayed by two pixels (two CLKs), after the first determination data column has been output.

The determining section 1 of the FIFO controller 50 compares the first determination data column and the second determination data column each of which is output by the FIFO memory 30 and determines the continuity of the pixels included in the first determination data column and the second determination data column. In the specific example illustrated in FIG. 3, the pixel 1 and the pixel 2 are pixels that are not required to undergo image processing, and thus, it is determined that the pixel 1 and the pixel 2 are continuous with each other. The determining section 1 compares the pixel 1 of the second determination data column and the pixel 2 of the first determination data column and determines that these pixels are continuous with each other. In the case where pixels are continuous with each other, the determining section 1 outputs a low-level (L) determination signal.

In the specific example illustrated in FIG. 3, the pixel 3 is a pixel that is required to undergo image processing, and thus, it is determined that the pixel 2 and the pixel 3 are not continuous with each other. The determining section 1 compares the pixel 2 of the second determination data column and the pixel 3 of the first determination data column and determines that these pixels are not continuous with each other. In the case where pixels are not continuous with each other, the determining section 1 outputs a high-level (H) determination signal.

Note that, in the specific example illustrated in FIG. 3, since a pixel 4 is a pixel that is not required to undergo image processing, it is also determined that the pixel 3 and the pixel 4 are not continuous with each other, and the determination signal output by from the determining section 1 is maintained at a high level (H). Subsequently, since the pixel 4 and a pixel 5 are pixels that are not required to undergo image processing, it is determined that the pixel 4 and the pixel 5 are continuous with each other, and the determination signal output by the determining section 1 is caused to return to a low level (L).

The SEL of the FIFO controller 50 functions as a determination holding section that holds a suspend instruction indicated by a determination signal output by the determining section 1 until the determination holding section receives a resume instruction. In the specific example illustrated in FIG. 3, an output (a determination signal) from the determining section 1 that has determined that the pixel 2 and the pixel 3 are not continuous with each other is maintained at the high level (H) and is output by the SEL after one CLK.

The determining section 2 of the FIFO controller 50 outputs a FIFO suspend signal in accordance with an output from the SEL. In the specific example illustrated in FIG. 3, the FIFO suspend signal is raised to a high level (H) one CLK after the timing at which the output from the SEL was raised to a high level (H). Once the FIFO suspend signal output by the determining section 2 has been raised to the high level (H), the output operation performed by the FIFO memory 30 is suspended. In other words, in the specific example illustrated in FIG. 3, the operation performed by the FIFO memory 30 for outputting the processing data column is suspended immediately after the pixel data item of the pixel 3 has been output.

The resume processing section 60 outputs a resume signal indicating a resume instruction by using, as triggers, completion timings at which data processing operations that are performed on data elements included in a processing data column are completed. In the specific example illustrated in FIG. 3, a processing completion signal indicating a completion timing at which an image processing operation that is performed on the pixel 3 of the processing data column is completed is output by the data processing section 40 (FIG. 2). The resume processing section 60 outputs the resume instruction by raising the resume signal to a high level (H) in accordance with the processing completion signal that is related to the pixel 3.

Once the resume signal indicating a resume instruction has been output, both the determining section 1 and the determining section 2 are reset, and accordingly, both the outputs of the determining section 1 and the determining section 2 are set to a low level (L). As a result, the FIFO suspend signal is set to a low level (L), and the FIFO memory 30 resumes the output operation. In other words, in the specific example illustrated in FIG. 3, the FIFO memory 30 resumes the operation for outputting the processing data column starting from the pixel data item of the pixel 4.

In the specific example illustrated in FIG. 3, that is to say, according to the data processing block 10 illustrated in FIG. 2, the operation of the FIFO memory 30 for outputting the processing data column is suspended until the image processing that is performed on the pixel 3 of the processing data column is completed.

Figure 4:
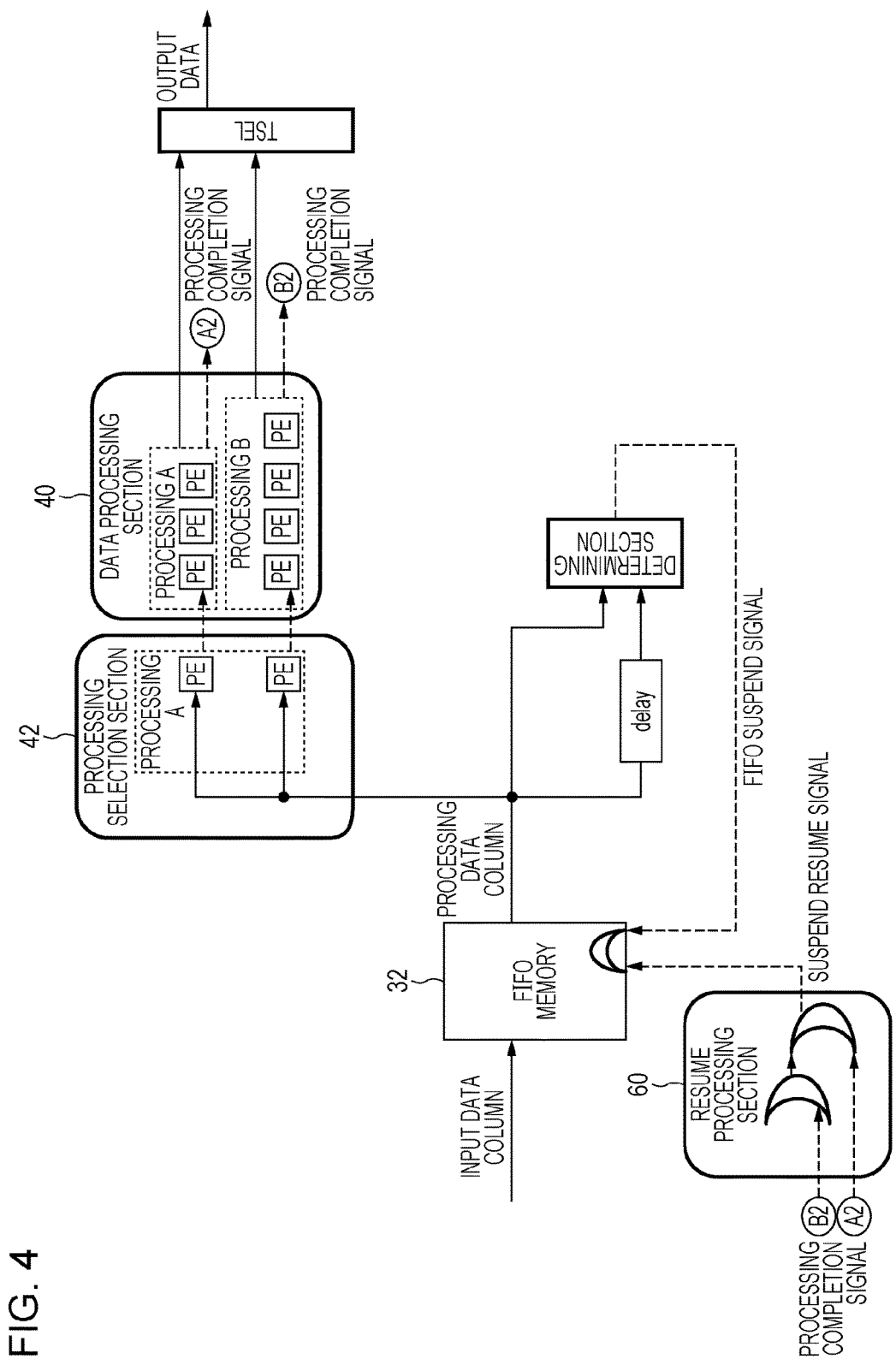
FIG. 4 is a diagram illustrating a comparative example of the data processing block illustrated in FIG. 2.

FIG. 4 is a diagram illustrating a comparative example of the data processing block 10 illustrated in FIG. 2. In the comparative example illustrated in FIG. 4, an input data column is output as is to a FIFO memory 32 without undergoing delay processing and is output as a processing data column by the FIFO memory 32. The processing data column output by the FIFO memory 32 is transmitted to the data processing section 40 via the processing selection section 42.

In the comparative example illustrated in FIG. 4, the data processing section 40 and the processing selection section 42 are the same as those in the specific example illustrated in FIG. 2. In other words, also in FIG. 4, the data processing section 40 performs data processing on plural data elements that form a processing data column. For example, the data processing section 40 performs image processing operations on plural pixel data items, which form a processing data column, in accordance with the pixel data items. The image processing operations according to the pixel data items are selected by the processing selection section 42. A token selector (TSEL) outputs the data elements, which have undergone the data processing operations and which have been output by the data processing section 40, one after another as output data columns.

In the comparative example illustrated in FIG. 4, a determining section compares the processing data column output by the FIFO memory 32 and a processing data column that has undergone delay processing so as to determine the continuity of pixels included in the processing data columns and outputs a FIFO suspend signal indicating a suspend instruction in accordance with the determination results.

The resume processing section 60 outputs a resume signal by using, as triggers, completion timings at which data processing operations that are performed on data elements included in a processing data column are completed. Processing completion signals indicating the completion timings for the data processing operations are output by the data processing section 40.

Figure 5:
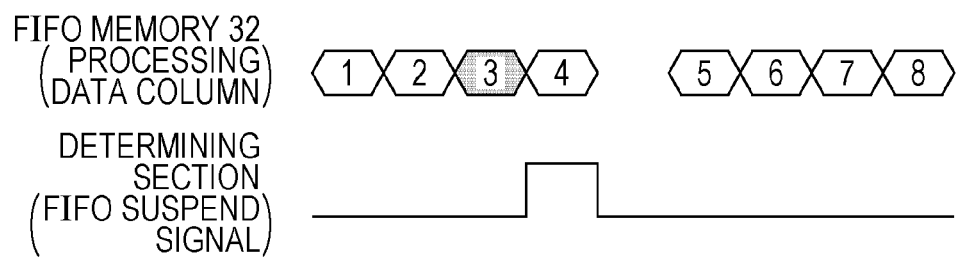
FIG. 5 is a diagram illustrating control performed in the comparative example illustrated in FIG. 4.

FIG. 5 is a diagram illustrating control performed in the comparative example illustrated in FIG. 4. FIG. 5 illustrates a processing data column output by the FIFO memory 32 illustrated in FIG. 4 and a FIFO suspend signal output by the determining section.

The processing data column is the same as that in the specific example illustrated in FIG. 3. In other words, also in the comparative example illustrated in FIG. 5, the processing data column is formed of plural pixel data items corresponding to plural pixels (pixels 1, 2, 3, and so on). Among the plural pixel data items forming the processing data column, only the pixel data item of the pixel 3 is a target for image processing. In other words, the pixel data items other than the pixel data item of the pixel 3 will not undergo image processing.

The determining section determines the continuity of pixels included in a processing data column output by the FIFO memory 32 and outputs a FIFO suspend signal indicating a suspend instruction in accordance with the determination results.

In the comparative example illustrated in FIG. 5, the pixel 1 and the pixel 2 are pixels that are not required to undergo image processing, and thus, it is determined that the pixel 1 and the pixel 2 are continuous with each other. In the case where pixels are continuous with each other, the determining section outputs a low-level (L) FIFO suspend signal. In addition, in the comparative example illustrated in FIG. 5, the pixel 3 is a pixel that is required to undergo image processing, and thus, it is determined that the pixel 2 and the pixel 3 are not continuous with each other. In the case where pixels are not continuous with each other, the determining section outputs a high-level (H) FIFO suspend signal.

Once the FIFO suspend signal output by the determining section has been raised to a high level (H), the output operation performed by the FIFO memory 32 is suspended. However, in the comparative example illustrated in FIG. 5 (FIG. 4), the level of the FIFO suspend signal is changed to the high level (H) after the pixel 3 of the processing data column has been output by the FIFO memory 32, and thus, a pixel 4 next to the pixel 3 of the processing data column is also output before the output operation of the FIFO memory 32 is suspended.

Thus, in the comparative example illustrated in FIG. 5 (FIG. 4), the pixel 4 is output by the FIFO memory 32 while the image processing is performed on the pixel 3 of the processing data column, and data overtaking, which is a phenomenon in which the pixel 4 is output first as an output data column before the pixel 3 is output as an output data column, may sometimes occur. Modifications of the resume processing section 60 illustrated in FIG. 2 will now be described.

Figure 6A:
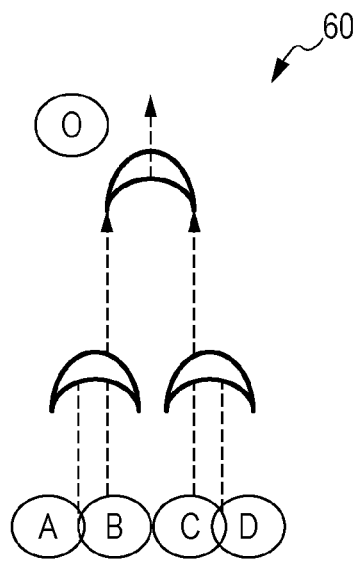
FIGS. 6A and 6B are diagrams each illustrating a modification of a resume processing section.
Figure 6B:
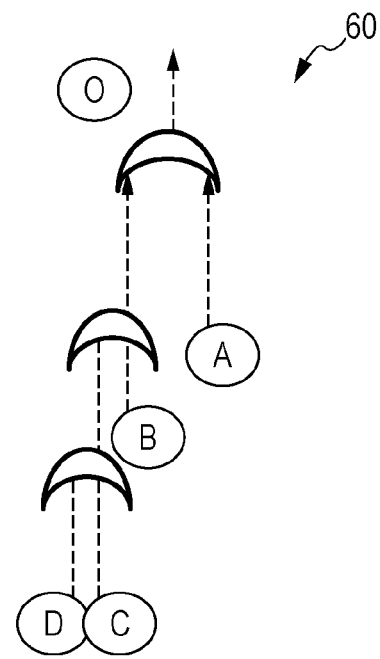

FIGS. 6A and 6B are diagrams each illustrating a modification of the resume processing section 60. Each of FIGS. 6A and 6B illustrates a specific example of the resume processing section 60 in which a resume signal O is output from four or about four image-processing completion signals A, B, C, and D.

FIG. 6A illustrates the resume processing section 60 having a balanced tree configuration. In the balanced tree configuration, all the four or about four processing completion signals A, B, C, and D are reflected in the resume signal O via two stages of OR circuits. Thus, all the four or about four processing completion signals A, B, C, and D are uniformly delayed and reflected in the resume signal O.

On the other hand, FIG. 6B illustrates the resume processing section 60 having an unbalanced tree configuration. In the unbalanced tree configuration illustrated in FIG. 6B, the processing completion signal A is reflected in the resume signal O via one stage of an OR circuit, the processing completion signal B is reflected in the resume signal O via two stages of OR circuits, and the processing completion signals C and D are reflected in the resume signal O via three stages of OR circuits. In other words, among the four or about four processing completion signals A, B, C, and D, the processing completion signal A is most quickly (with the smallest delay) reflected in the resume signal O.

Thus, for example, the cancel processing section 60 may have an unbalanced tree configuration in which, before plural image processing operations are performed, frequency of usage of the plural image processing operations are determined beforehand by using a test chart or the like, and the amount by which a processing completion signal of the most frequently performed image processing operation is delayed is set to be small.

Figure 7:
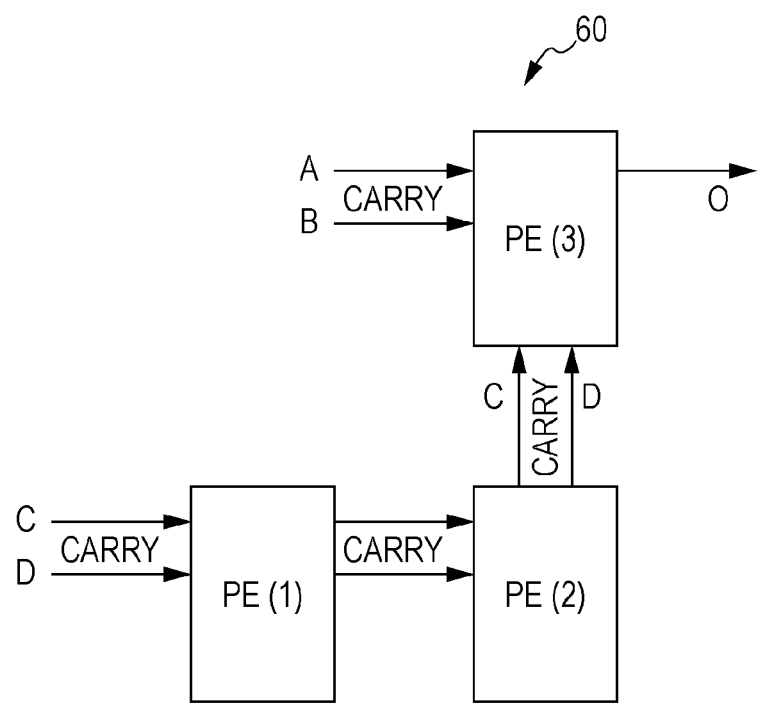
FIG. 7 is a diagram illustrating a specific example of the resume processing section included in a reconfigurable circuit.

FIG. 7 is a diagram illustrating a specific example of the resume processing section 60 included in a reconfigurable circuit. The reconfigurable circuit, which is, for example, a dynamically reconfigurable processor (DRP) includes a large number (e.g., about several hundreds to about a thousand) of processing elements (PEs) arranged in a grid-like pattern. By arranging the large number of PEs (selecting PEs to be used) and setting wiring between the PEs, that is, by performing arrangement and wiring (fitting) of the PEs, a desired circuit configuration, which is, for example, the circuit configuration of the resume processing section 60 may be realized.

FIG. 7 illustrates a specific example of the resume processing section 60 in which a resume signal O is output from four or about four image processing completion signals A, B, C, and D. FIG. 7 illustrates a specific example in which the circuit configuration of the resume processing section 60 is realized by using carry signals of PEs (1), (2), and (3).

In FIG. 7, the processing completion signals C and D are input as two input carry signals of the PE (1). Then, the processing completion signals C and D are output by the PE (1) and input as two input carry signals of the PE (2). Subsequently, the processing completion signals C and D are output by the PE (2) and input as two input carry signals of the PE (3). The processing completion signals A and B are also input to the PE (3) as two input carry signals. In other words, the four or about four processing completion signals A, B, C, and D are input to the PE (3) as four or about four input carry signals.

Although the exemplary embodiment of the present invention has been described above, the above-described exemplary embodiment is merely an example in all respects and does not limit the present invention. Various modifications may be made within the gist of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus comprising:
   at least one processor configured to execute:
   a preprocessing section configured to receive an input data column as a first determination data column, generate a second determination data column including data from the input data column by delaying the input data column, and generate a third determination column including data from the input data column by delaying the input data column by an amount larger than an amount by which the input data column is delayed in order to obtain the second determination data column; and
   a controller configured to control, by using the first determination data column and the second determination data column as indices, an operation performed by a FIFO memory for outputting the third determination column as a processing data column, which has been input to the FIFO memory.

2. The data processing apparatus according to claim 1, wherein the controller further comprises:
   a determining section configured to obtain a determination signal indicating a suspend instruction by comparing the first determination data column and the second determination data column and
   a holding section configured to hold the suspend instruction indicated by the determination signal until the holding section receives a resume instruction, and
   wherein the operation performed by the FIFO memory for outputting the processing data column is suspended during a suspend period that corresponds to the suspend instruction, which is held.

3. The data processing apparatus according to claim 2, wherein the controller further comprises:
   a resume processing section configured to output the resume signal indicating the resume instruction by using, as triggers, completion timings at which data processing operations that are performed on data items included in the processing data column are completed.

4. The data processing apparatus according to claim 3, wherein the resume processing section is further configured to output the output the resume signal by using a circuit configuration in which a delay time that is a period from a completion timing for a data processing operation that is most frequently performed among a plurality of data processing operations until the resume instruction is obtained is set to be shortest.

5. The data processing apparatus according to claim 4, wherein the resume processing section is formed in a reconfigurable circuit, which includes a plurality of processing elements (PEs), and has a circuit configuration that includes at least one PE to which about four carry signals corresponding to completion timings for about four data processing operations are to be input.

6. The data processing apparatus according to claim 3, wherein the resume processing section is formed in a reconfigurable circuit, which includes a plurality of processing elements (PEs), and has a circuit configuration that includes at least one PE to which about four carry signals corresponding to completion timings for about four data processing operations are to be input.

7. The data processing method according to claim 1, wherein the second determination column or the third determination include same data as the input data column.

8. A data processing method comprising:
   receiving an input data column as a first determination data column, generate a second determination data column including data from the input data column by delaying the input data column, and generate a third determination column including data from the input data column by delaying the input data column by an amount larger than an amount by which the input data column is delayed in order to obtain the second determination data column; and
   controlling, by using the first determination data column and the second determination data column as indices, an operation performed by a FIFO memory for outputting the third determination column as a processing data column, which has been input to the FIFO memory.

9. The data processing apparatus according to claim 8, wherein the second determination column or the third determination include same data as the input data column.

10. A non-transitory computer readable medium storing a program causing a computer to execute a process, the process comprising:
    receiving an input data column as a first determination data column, generate a second determination data column including data from the input data column by delaying the input data column, and generate a third determination column including data from the input data column by delaying the input data column by an amount larger than an amount by which the input data column is delayed in order to obtain the second determination data column; and controlling, by using the first determination data column and the second determination data column as indices, an operation performed by a FIFO memory for outputting the third determination column as a processing data column, which has been input to the FIFO memory.

11. The non-transitory computer readable medium according to claim 10, wherein the second determination column or the third determination include same data as the input data column.

* * * * *